United States Patent [19]
Mosley

[11] 3,919,734
[45] Nov. 18, 1975

[54] ROTARY WINDSHIELD WIPER FOR VEHICLES

[76] Inventor: John H. Mosley, Rte. No. 1, Franklin, Ill. 62638

[22] Filed: Jan. 15, 1975

[21] Appl. No.: 541,110

[52] U.S. Cl............................ 15/250.22; 15/250.06
[51] Int. Cl.² ........................................... B60S 1/44
[58] Field of Search ....... 15/250.22, 250.36–250.42, 15/250.05–250.09

[56] References Cited
UNITED STATES PATENTS

| | | | |
|---|---|---|---|
| 2,178,068 | 10/1939 | Cordova | 15/250.22 X |
| 2,181,066 | 11/1939 | Rau | 15/250.22 X |
| 2,239,754 | 4/1941 | Marti | 15/250.22 X |
| 2,550,504 | 4/1951 | Vidrick et al. | 15/250.06 |
| 3,649,990 | 3/1972 | Saito | 15/250.22 |

*Primary Examiner*—Peter Feldman

[57] ABSTRACT

A rotary windshield wiper for vehicles consisting of a retractable arm movable between a storage position out of the driver's line of vision, and an operable position in the driver's line of vision of a vehicle and supporting at its projecting end a wiper blade having an electrical heating element disposed therethrough, the wiper blade being mounted for rotary movement and rotatively driven by means of a flexible Bowden cable connected to a motor mounted in the vehicle. The wiper blade includes a window engaging wiping element manufactured of non-cellular plastic foam material.

1 Claim, 6 Drawing Figures

U.S. Patent  Nov. 18, 1975  3,919,734
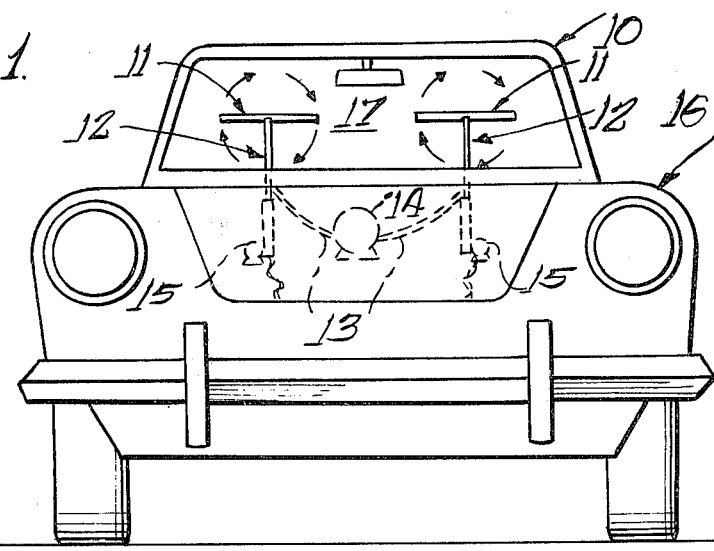
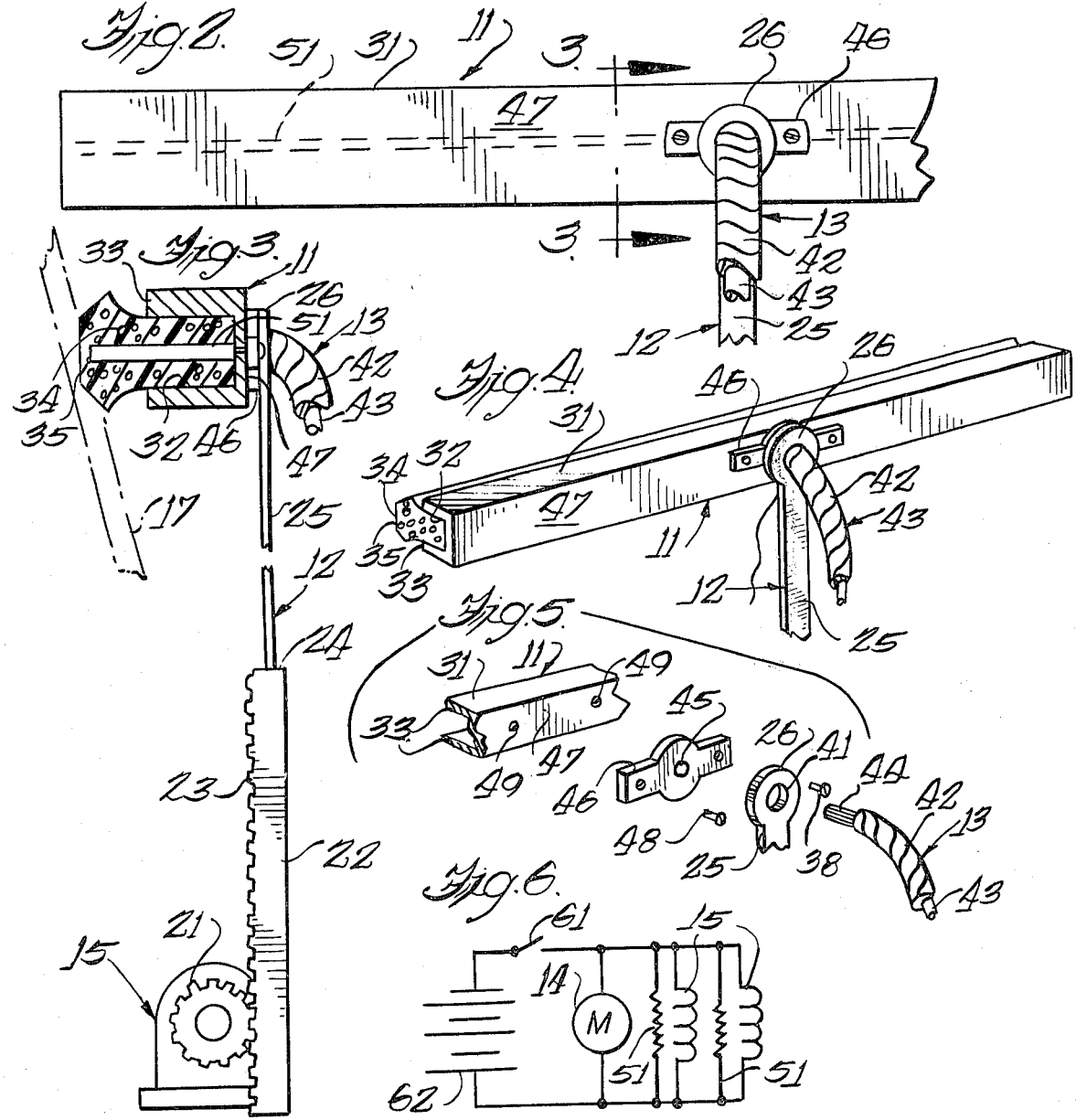

ROTARY WINDSHIELD WIPER FOR VEHICLES

BACKGROUND OF THE INVENTION

1. Field of the Invention

This invention relates generally to vehicle accessories and more particularly to a novel and improved windshield wiper for vehicles.

2. Description of the Prior Art

While designs and improvements have been made in vehicles over the years, very little if any change has been made in the windshield wipers as provided on such vehicles. Thus, the conventional windshield wiper is one which oscillates in a back-and-forth manner having a portion engaging and scraping against the glass to clean the same. Such conventional wipers are frequently unsatisfactory in that not only are they noisy and thus a disturbance to the vehicle driver, the area of surface contact between the wiper blade and the glass is very slight so as to frequently result in streaks and smudges of the glass directly in the line of vision of the driver, this being a distraction to the driver while driving the vehicle. A further problem is that the oscillatory back-and-forth mechanism is subject to malfunctioning so that a vehicle driver may find himself with no means of clearing the window in adverse weather, this being hazardous both to the driver and passengers of the vehicle as well as to other vehicles on the roadway due to the driver's limited area of vision.

SUMMARY OF THE INVENTION

The present invention remedies and overcomes the deficiencies and disadvantages of presently available windshield wipers by providing a novel rotary windshield wiper where the wiper blade is spun in a rotary manner to clear the windshield glass area, the speed of rotation being of a high rate to make the blade substantially invisible to the driver's vision in the same manner as which an airplane propeller when spinning is substantially invisible to the vision of the pilot.

It is a feature of the present invention to provide a rotary windshield wiper for vehicles.

A further feature of the present invention provides a rotary windshield wiper for vehicles which is relatively simple in its construction and which therefore may be readily manufactured at a competitive price to conventional windshield wipers so that it may be retailed at a sufficiently low price to encourage widespread use thereof among the general public and vehicle manufacturers.

Still a further feature of the present invention provides a rotary windshield wiper for vehicles which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a front elevational view of a vehicle having the windshield wipers of the present invention mounted thereon;

FIG. 2 is a fragmentary top plan view of the windshield wiper of the present invention;

FIG. 3 is a cross-sectional view taken along line 3—3 of FIG. 2;

FIG. 4 is a perspective view of the windshield wiper of the invention;

FIG. 5 is an exploded fragmentary perspective view of a portion of the windshield wiper illustrating the mounting of the drive cable to the wiper blade; and FIG. 6 is an electrical schematic diagram of the wiring of the windshield wiper.

DESCRIPTION OF THE PREFERRED EMBODIMENT

Referring not to the drawings in detail there is illustrated a preferred form of a rotary windshield wiper for vehicles constructed in accordance with the principles of the present invention and which is designated generally in its entirety by the reference numeral 10 and which is comprised of a pair of wiper blades 11 each rotatively affixed at it's midpoint to the end of a pair of wiper arms 12 and with each supporting one end of a flexible Bowden drive cable 13 having one end rotatively affixed to the wiper blade 11 for drivingly rotating the same about its midpoint and with its opposite end connected to drive motor 14, and a pair of motors 15 each associated with bottom end portions of wiper arms 12 for moving the same between an operable position placing wiper blade 11 in the line of vision of the driver and passengers, and an inoperable position placing wiper blade 11 out of the line of vision of the driver and passengers. The wipers are illustrated on vehicle 16 having windshield 17.

As the wiper arm assemblies and blades are identical, only one will be described in the following description for ease of descriptive purposes.

Each of the motors 15 are provided with a toothed gear 21 rotatively driven thereby.

Each of the wiper arms 12 include an elongated base member 22 having ratchet forming teeth 23 disposed at longitudinally spaced apart positions on one side thereof and mounted to be in meshing engagement with the teeth of motor gear 21, the top end 24 of the base having a supporting member 25 projecting upwardly and outwardly therefrom terminating at top end 26 adjacent wiper blade 11.

Each wiper blade 11 includes a longitudinally elongated U-shaped channel member 31 having a channel 32 defined therethrough opening out of front end 33 thereof and which receives therein a window engaging wiping member 34 manufactured of a non-cellular plastic foam material which will make positive contact with the surface of windshield 17 in view of the compressibility features of the material. The leading edge 35 of the wiping member 34 preferably has doubled or rounded longitudinal edges to facilitate the members gliding over the surface of windshield 17.

The top end portion 26 of supporting arm 25 is formed in an eyelet manner having a circular opening 31 provided therein. The Bowden drive cable 13 includes flexible cable housing 42 and flexible drive shaft 43 having a splined drive end 44. Splined drive end 44 is passed through opening 41 with cable 42 being affixed to support arm 25, drive end being received in splined opening 45 of mounting bracket 46 which is secured to the back surface 47 of channel member 41 by screws 48 engaged in openings 49.

The opposite end of each of the drive cables 43 are connected to the drive shaft (not shown) of motor 14 for simultaneous driving thereby.

Disposed inwardly of each of the wiper members 34 is an elongated metallic electrical conducting strip 51 formed of a general resistance element and connected to the end 44 of Bowden cable 13 with its opposite end being connected to channel member 31 for grounding to the vehicle such that an electric current may be provided through the Bowden cable to the heating element for heating the same.

As seen in FIG. 6, motor 14, the two motors 15 and the two heating elements 51 are all connected in electrical parallel relationship as controlled by switch 61 for selective energization and de-energization from vehicle battery 62.

In operation, closing of switch 61 energizes motors 15 which, through gear teeth 21 and 23, drive wiper arms 12 outwardly of their storage position in the vehicle to a position where top end portion 26 is centered in the vehicle driver's and passenger's line of vision on windshield 17. Motor 14 is also activated to effect through Bowden cables 13 the rotary drive of the wiper blades 11 at a speed making them substantially invisible to the vehicle driver and passengers and in a manner to thoroughly clean the windshield in a quiet and rapid manner.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A windshield wiper for vehicles for cleaning the windshield surface of the vehicle comprising, in combination:

a wiper blade means;

wiper arm means being defined by an elongated channel forming member of U-shaped cross-sectional configuration having a flat back surface and a flat front surface with a slot extending completely therethrough and opening out of said front surface, a length of material defining a wiping member affixed in said slot and projecting forwardly outwardly therefrom and being of a non-cellular plastic foam material to engage and wipe the windshield surface, said wiper arm means further including a bracket affixed centrally at the back surface at the midpoint of said channel member and having a grooved opening centrally thereof, elongated support arm member having a top and a bottom end and an elongated base member having its top end affixed to said bottom end of the supporting arm with said base member extending downwardly therefrom and terminating in a bottom end, a series of longitudinally aligned and spaced-apart ratchet teeth formed along one side surface of said base member between said top and bottom ends thereof the top end portion of said support arm being formed in an eyelet and having a circular opening extending therethrough;

means rotatively affixing said wiper blade means to said wiper arm means for rotation relative thereto;

motor means;

means drivingly connecting said motor means to said wiper blade means to effect driving rotation thereof, the drive means being connected to the grooved opening in the central portion of the bracket and being mounted within the circular opening extending through the eyelet;

drive means connected to said wiper arm means for moving said arm means between an operative location positioning said wiper blade means on said windshield surface in the line of vision of the vehicle driver and passengers for cleaning the windshield, and an inoperative location positioning said wiper means out of the line of vision of said vehicle driver and passengers, the wiper arm positioning means including an electrically operated motor and a toothed drive gear drivingly connected to said motor means and having its teeth in meshing engagement with the ratchet teeth of the arm base member; and heating means disposed in said wiper arm means for heating the same, the heating means including an elongated electrical resistance strip embedded in said wiping member material and extending therealong, one portion of said heating element being electrically connected to one end of said drive cable, the opposite end portion of said heating element being electrically connected to said channel member of said wiper arm and means electrically connecting said drive cable to a source of electrical energy for electrically energizing said heating element therefrom.

* * * * *